United States Patent
Mathe

[15] 3,650,173
[45] Mar. 21, 1972

[54] POSITIVE LOCKING SNAP-FASTENER

[72] Inventor: Istvan Mathe, Cicero, Ill.

[73] Assignee: The Bunker-Ramo Corporation, Oak Brook, Ill.

[22] Filed: Jan. 2, 1970

[21] Appl. No.: 237

[52] U.S. Cl. ..................................................85/81, 85/84
[51] Int. Cl. ......................................................F16b 13/06
[58] Field of Search..................85/80, 81, 82, 83, 84, 72; 24/211 R, 208 A, 73.8 P, 73 HS, 73 PF, 73 PM

[56] References Cited

UNITED STATES PATENTS

| 2,983,008 | 5/1961 | Von Rath............................24/73 HS |
| 3,099,931 | 8/1963 | Ferdinand..................................85/80 |
| 3,385,157 | 5/1968 | Rapata........................................85/83 |

FOREIGN PATENTS OR APPLICATIONS

| 11,620 | 5/1910 | Great Britain .......................24/211 R |
| 925,034 | 5/1963 | Great Britain...........................85/84 |
| 991,375 | 5/1965 | Great Britain...........................85/84 |
| 1,109,793 | 4/1968 | Great Britain...........................85/80 |
| 1,137,727 | 12/1968 | Great Britain .......................24/73 PM |
| 918,504 | 10/1946 | France........................................85/84 |
| 1,581,125 | 8/1969 | France ....................................24/73 PF |
| 1,202,068 | 9/1965 | Germany..............................24/73 PM |
| 684,373 | 3/1965 | Italy...........................................85/84 |
| 207,316 | 9/1966 | Sweden.....................................85/80 |

Primary Examiner—Marion Parsons, Jr.
Attorney—Frederick M. Arbuckle

[57] ABSTRACT

A snap-fastener of two parts, provided by pin and plug members, for retention within apertures of loose tolerance requirements. The pin member includes, at one end, a head with integral conical washer, and at the other end, a boss which has a slot for a closing of the boss together to pass through an aperture. The plug member is received within an axial bore through the pin and is slidable within the slot to spread the boss and an inward taper thereof against an aperture edge. As the boss spreads, the taper rides by the aperture edge to force the pin inwardly against resistance of the washer. Tension, provided by the washer resistance, urges the aperture edge against the taper to clamp the interior of the boss about the plug, which then prevents closing of the slot for a positively locked retention until manual removal of the plug from the slot.

7 Claims, 9 Drawing Figures

PATENTED MAR 21 1972
3,650,173
SHEET 1 OF 2
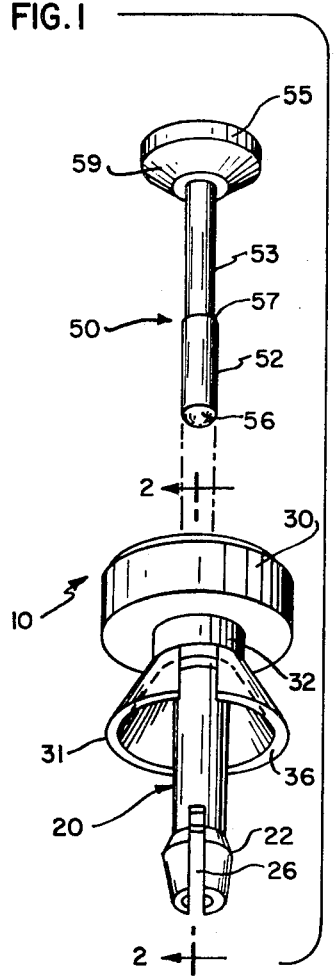
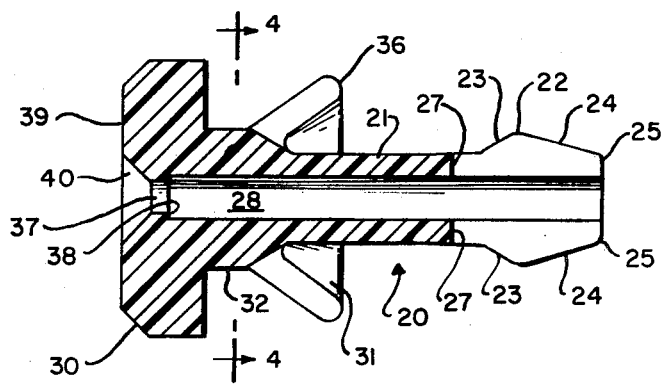
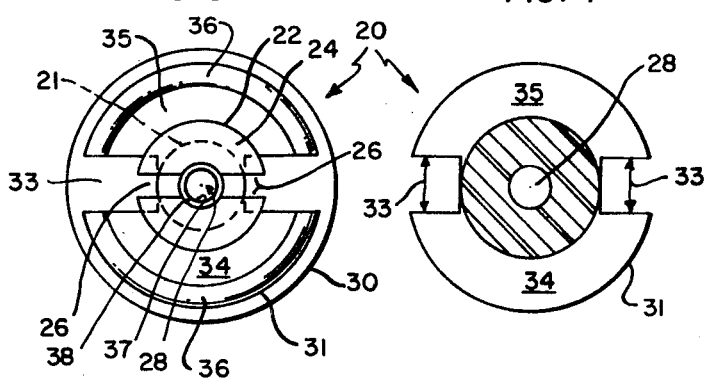
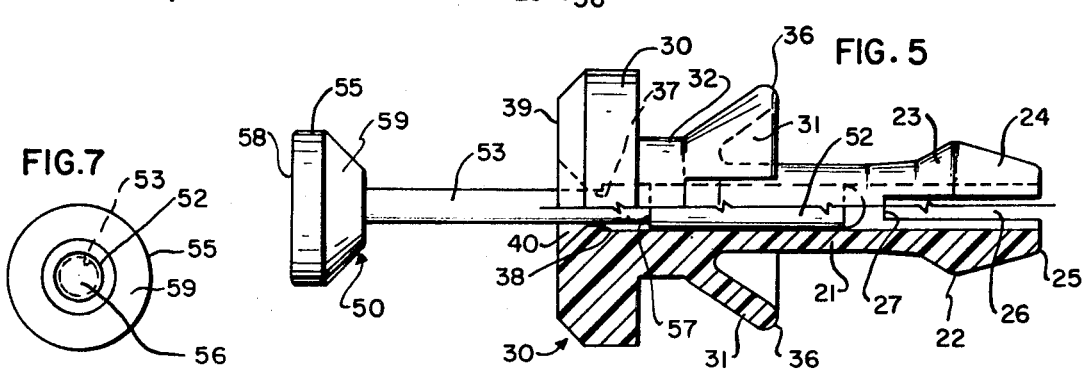
INVENTOR
Istvan Mathe
BY Lawrence S. Gallea
ATTY.

INVENTOR
Istvan Mathe
BY Lawrence S. Galka
ATTY.

POSITIVE LOCKING SNAP-FASTENER

SUMMARY OF THE INVENTION

This invention relates generally to fasteners, and more particularly, to a snap-fastener which can be positively locked.

Many manufactured components are shipped for subsequent connection and use in an assembly, or the like. Protection of the components during transit is, of course, important, and in the case of delicate precision components, indispensable. Thus, it has been the practice to ship components after mounting them upon protective structures. For example, panel mounted electronic components, such as connectors, and the like, are often mounted upon dummy panels to provide protection during transit. Threaded fasteners, such as the common screws, nuts and bolts, have been utilized for securement of the components to the protective structure.

The awaiting assemblies are often prepared for reception of a component by the provision of pre-drilled apertures for acceptance of the fasteners. Size tolerances of the apertures are relatively critical if threaded engagement therein by the fasteners is desired, and it is often found that the threaded fastener is either too large or too small for the aperture provided. Naturally, it is highly desirable that the component be quickly and easily removed from the protective structure and then with equal facility, fastened onto the awaiting assembly. Utilization of the threaded fasteners has been time consuming. That is, while the disengagement and engagement of a single threaded fastener may not seem to require a great deal of time, it may be appreciated that where more than one fastener is required and where there are many components, the time consumption can be considerable. Also, since fasteners have been known to loosen upon vibration, it has been the practice to tighten them to a very considerable extent and to utilize lock washers, which provided further difficulties in removal. Tools, such as screw drivers, wrenches, and the like, are of course necessary in the utilization of the threaded fasteners. Furthermore, when the heads and/or threads of the fasteners become damaged, special tools may become necessary for removal.

Therefore, to overcome the foregoing and other difficulties of the prior art, new and improved fasteners are required. The present invention envisions a snap-fastener with positive locked retention, which may be quickly and readily engaged and disengaged manually without the need of tools. In accordance with the present invention the snap-fastener is of two parts provided by a pin member and a plug member. The pin has, at one end, an enlarged boss, and at the other end, a head including an integral conical washer which maintains tension during retention of the fastener in an aperture. The boss is provided with one or more slots which permits the boss to yield upon insertion through the aperture. An axial bore extending through the pin is coincident with the slot. The boss also includes an inward taper. A plug member is slidably received in the axial bore and within the slot for spreading of the boss and inward taper.

Retention of the fastener in accordance with the present invention may be accomplished in an aperture through a wall, say a panel or the like, where both the aperture size and wall thickness have loose tolerance requirements. For insertion of the pin, the plug must be withdrawn from the slot to allow the boss to yield and pass through the aperture to beyond the far side of the wall. The plug is then slid inwardly to spread the boss and inward taper against the far side of the wall, which forces the pin inwardly against the resistance of the conical washer. Retention of the fastener is by engagement of the boss against the far side of the wall. Tension between the washer and boss positively locks retention by urging the inward taper against the aperture edge to clamp inner surfaces of the boss about the plug to an extent preventing the plug from accidentally disengaging as a result of ordinary vibrational forces but permitting intentional manual removal thereof without requiring the use of tools.

Thus, one of the objects of this invention is to provide an improved fastener which may be slidably inserted through an aperture and a positively locked retention therein.

It is an object of this invention to provide an improved positive locking fastener which may be inserted into and removed from an aperture in a wall member without the use of tools.

Another object of this invention is to provide a fastener which is readily engaged in and disengaged from an aperture in a wall member and which yet achieves a secure positively locked retention within apertures and through wall thicknesses of relatively loose tolerance limitations.

Still another object of this invention is the provision of a fastener which utilizes available materials and which may be manufactured in accordance with known economical mass production techniques.

Also, an object of this invention is the provision of a fastener of two parts, one captivated within the other, to prevent separation and loss of the parts.

Yet another object of this invention is to provide a fastener having an integral resilient part which acts to positively lock retention of the fastener in an aperture through a wall or the like.

Further, and other objects and a more complete understanding of the invention may be had by referring to the following description and claims, taken in conjunction with the accompanying drawings.

DESCRIPTION OF THE DRAWINGS

For the purpose of illustrating the invention, there is shown in the drawings an embodiment which is presently preferred, it being understood, however, that the present invention is not necessarily limited to the precise arrangement and instrumentality there shown.

FIG. 1 is an exploded perspective view showing the fastener of the present invention in two separated parts.

FIG. 2 is a cross-sectional view of the pin member part of the fastener shown in FIG. 1, which is enlarged with respect thereto, and taken along the line 2—2 thereof.

FIG. 3 is an end view of the pin member shown in FIG. 2 looking to the left thereof.

FIG. 4 is a cross-sectional view of the pin member shown in FIG. 2 taken in the direction of the arrows 4—4 thereof.

FIG. 5 is a partial sectional side view of the fastener of the present invention showing both parts thereof together.

FIG. 6 is a side view of the plug member part of the invented fastener shown in FIGS. 1 and 5.

FIG. 7 is an end view of the plug member shown in FIG. 6 looking to the left thereof.

DESCRIPTION OF THE PREFERRED EMBODIMENT

Figure 8:
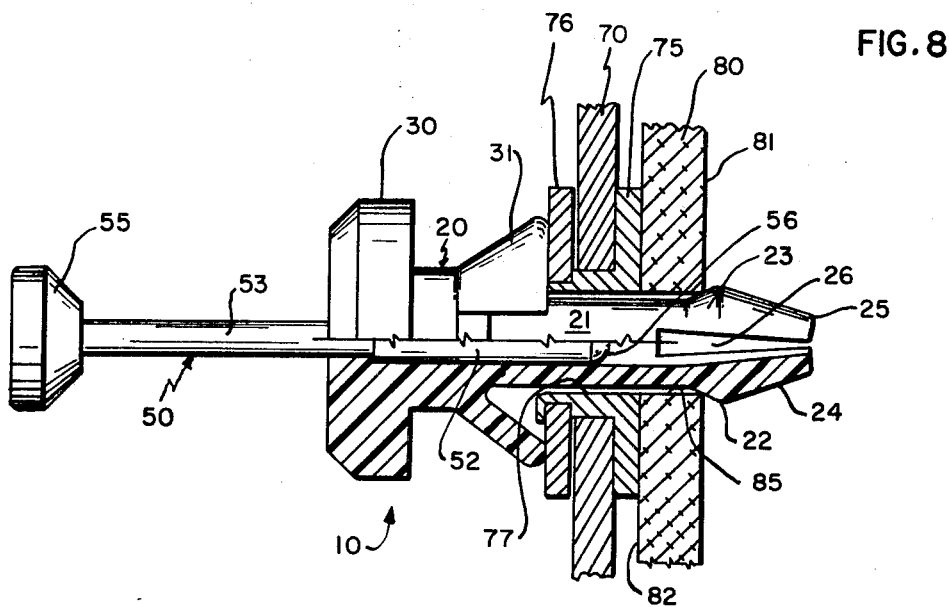
FIG. 8 is a side view, partially in section, of the fastener of the present invention showing the two parts thereof disposed for insertion through or removal from an aperture.

Referring now to the drawings in detail, wherein like numerals indicate like elements, there is shown in FIG. 1 an illustration of a fastener embodying the present invention indicated generally by the numeral 10. As clearly revealed by the exploded view of FIG. 1, the fastener 10 is comprised of two parts, namely, a pin member 20 and a plug member 50.

Details of the pin member 20 are shown in FIGS. 2 through 4. The pin 20 includes a generally tubular portion 21 and at one end an enlarged boss portion 22 for insertion within an aperture in a wall or the like as will be described hereinafter. The boss 22 includes inward taper 23, outward taper 24, and a rounded tip 25. A slot 26 bisects the boss 22 and extends into tubular portion 21 a short distance beyond the inward longitudinal extremity of the inward taper 23 to the slot ends at 27. A bore 28 extends axially through the pin 20 and is intersected by the slot 26, as shown. It is understood, that more than one slot 26 may be provided, if desired, for additional flexibility of boss 22. On the other hand, other resilient means, such as provided by axial notching of boss 22, may allow the boss to yield sufficiently for passage through an aperture.

At the opposite end of pin member 20, is the head portion 30 with an elastic means for deforming an axial distance along the pin, which in the embodiment shown is provided by the integral conical washer member 31. Notice, as may be visualized readily with reference to FIG. 4, that the conical washer 31 is slotted at 33 to provide separate individual skirt segments 34, 35. Although, two skirt segments 34, 35 are shown, it is to be understood, in accordance with the present invention, that, if desired, more skirt segments could be provided by appropriate slotting. The conical washer 31 extends outwardly, from a collar portion 32, in the general direction of the boss 22, to terminate at a bearing end 36, which may be rounded, as shown. Notice that the axial bore 28 includes a constriction 37 within the head 30, as may be best visualized with reference to FIG. 2. The construction 37 provides a captivating ledge at 38. It is to be understood that the constriction 37 of axial bore 28 continues outwardly through the head 30 and is open to the head surface 39. A counter sink 40 may be provided at the outer end of the constriction 37, as illustrated in FIG. 2.

The aforedescribed pin member 20 is preferably of a resilient material that is readily molded or machined. For example, the pin members 20 may be formed of molded nylon blanks, which are machined to provide the slot 26, axial bore 28, the constriction 37, counter sink 40 and the slotted portions at 33 of the washer 31. It is noted that the slots at 26 and 33, for the boss 22 and washer 31, respectively, lie in parallel plains. This arrangement has been found advantageous in limiting machinery steps necessary in the manufacture of the pins. Naturally, in accordance with the present invention, other relative dispositions between the slots at 26 and 33 may be equally as suitable.

The detail of the plug member 50 may be readily ascertained from the views of FIGS. 6 and 7. In accordance with the present invention, the plug member 50 is essentially a long rodlike member having a plug section 52, a reduced neck section 53 and an enlarged end 55. The plug section 52 is of a diameter corresponding to the axial bore 28 for a close slidable fit therein. The plug section 52 extends between a rounded end at 56 and a sharp reduction at ledge 57. The reduced neck section 53 is of a diameter corresponding to the restriction 37 in pin 20. The enlarged end 55 includes a thumb surface at 58 and a conical surface at 59 corresponding to the counter sink 40 of pin member 20. The plug member 50 may be of a material which is readily machinable in an automatic machine tool. Nylon again would be suitable, however, it is preferable that the plug member 50 be somewhat harder and less resilient than the pin member 20. In accordance with the present invention, a brass material for the plug member 50 is preferred for use in conjunction with a pin member 20 of nylon.

During the manufacturing assembly of the fastener 10, in accordance with the present invention, the plug section 52 is forced through the constriction 37 to provide the two part fastener 10, shown in FIG. 5. The resiliency of the nylon pin member 20 allows the constriction 37 to return to its original size so that if an attempt is made to remove the plug 50 ledge 57 will abut against captivating ledge 38 and prevent removal thereof. Thus, plug 50 is captivated within the pin 20 to effectively prevent separation and loss thereof.

The lengths of the plug section 52 and neck section 53 are chosen so that the plug section 52 may extend the entire length of the boss portion 22 and yet be completely withdrawn therefrom within the tubular portion 21 and head portion 30. It is understood, of course, that the dimensions of fastener 10 may be chosen to accommodated any wall thickness and aperture size. Furthermore, loose tolerance clearances for the wall thickness and aperture size may be accommodated. That is, aperture size limitations for particular fastener 10 would be limited between the maximum and minimum sizes of the inward taper 23. At the same time, wall thickness limitations would have a minimum dimension governed by the distance between the bearing end 36 and the minimum size of taper 23, while the maximum dimension would be governed by the distance between the outward deformation limit of conical washer 31 and the maximum size of inward taper 23. It is understood, of course, that the aforesaid maximum and minimum tolerance limits must be slightly greater than and less than the distance and sizes stated, respectively.

Figure 9:
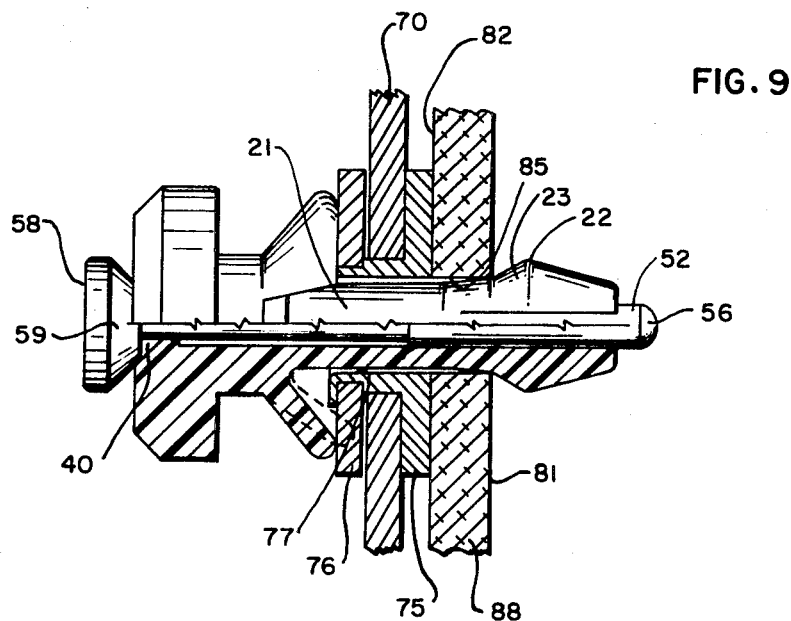
FIG. 9 is a side view, partially in section, of the fastener of the present invention, showing the two parts thereof disposed for a positively locked retention.

Attention is directed to FIGS. 8 and 9 for a description in accordance with the present invention, of the insertion, positively locked retention, and removal of the fastener 10. For purposes of illustration, a component represented at 70 is connected to a wall 80 by means of the fastener 10 of the present invention. The component 70 may include spacers and the like such as a float bushing 75 and retaining washer 76. The size of aperture 77 through the float bushing 75 is not critical, and may have a somewhat snug fit with reference to tubular portion 21 for a captivation together of the fastener 10 and component 70, if desired. Aperture 85 through the wall 80 is preferably somewhat looser, of a size determined by the aforedescribed size tolerances. The thickness of wall 80 between far side 81 and near side 82 is likewise within the tolerances described above, however, allowance is made for the component 70, float bushing 75 and washer 76. For insertion, the plug member 50 is disposed with plug section 52 within the tubular portion 21 and head portion 30 of the pin member 20 as shown in FIG. 8. The rounded tip 25 of boss 22 facilitates insertion at far side 82 of wall 80 into the aperture 85. As pin member 20 is pushed inward, (toward the right in FIG. 8), the outward taper 24 engages the inside of aperture 85 to cause a gradual yielding of boss 22 by it closing together at the slot 26 to allow passage of the boss 22 therethrough to the position shown in FIG. 8. The boss portion 22 extends beyond the far side 81, as shown. Resistance to deformation by the conical washer 31 will cause the edge of aperture 85 at far side 81 to bear against the inward taper 23 causing a partial closing of the boss about slot 26 as indicated in FIG. 8. In the position shown at FIG. 8 the pin 10 is readily removable by merely pulling the pin outward toward the left as viewed in the Figure. In this case, the inward taper 23 will again cause a yielding of boss 22 by closing together at the slot 26 allowing the boss 22 to pass through the aperture 85.

For a positively locked retention the plug member 50 is forced inward, as in FIG. 9, to spread the boss 22 and inward taper 23 against the far side 81. This forces the pin member 20 inwardly deforming the conical washer 31 as indicated by the phantom representation of FIG. 9. That is, spreading of inward taper 23 against far side 81 will forcefully side the pin 20 inwardly (to the right in the Figures) by virtue of the aperture edge riding the incline of taper 23. The rounded end 56 of plug portion 52 acts as a cam to force the slot 26 apart. The conical washer 31 urges the pin outwardly (to the left in the Figures) to force the aperture edge against the inward taper 23 which maintains a holding tension against the boss 22 to thus clamp plug 50 within the pin member 20. Thus, the fastener 10 is positively locked for retention by the boss 22 against the far side 81 of wall 82.

While particular embodiments of the invention have been illustrated and described, it will be obvious to those skilled in the art that changes and modifications may be made without departhing from the invention in its broader aspects, and, therefore the aim of the appended claims is to cover all such changes and modifications as fall within the true spirit and scope of the invention.

I claim:

1. A positive locking snap-fastener for retention within an aperture through a wall, comprising in combination:
    a pin member with an axial bore therethrough and including
        a head portion with elastic means which are enlarged with respect to said aperture to bear against the near side of said wall for deforming an axial distance along said pin, and a boss portion which is enlarged with respect to said aperture, said boss having an inward taper extending toward the head and varying between maximum and minimum transverse sizes along an axial length of said pin and a slot for allowing said boss to yield by closing together about said bore upon insertion into said aperture to pass said boss therethrough from the near side to beyond the far side of said wall, said bore and slot being coincident and said distance, sizes and length defining loose tolerance limits of apertures and walls within which said fastener can be retained, said head and boss being at opposite ends of said pin and said elastic means including a slotted conical washer extending outwardly toward said boss to provide skirt segments for spreading deformation; and a plug member slidably received in said bore and within said slot to spread said boss and said inward taper against said far side which rides the incline of said inward taper to force said pin inwardly against the resistance of said slotted conical washer for tension between said conical washer and boss which clamps said plug therein to prevent closing of said slot for a positively locked retention of said boss against said far side of said wall until removal of said plug from said slot, said plug having an enlarged outer end, an inner end, and a length of essentially uniform cross section extending along said axial length of said pin adjacent said boss to said inner end of said plug.

2. A fastener in accordance with claim 1 wherein said slot extends inwardly beyond said inward taper, and said boss has a rounded tip to facilitate said insertion.

3. A fastener in accordance with claim 2 wherein said boss portion has an outward taper to said rounded tip, said closing of said boss upon said insertion being gradual and with mechanical advantage by action of said outward taper within said aperture.

4. A fastener in accordance with claim 3 including means for captivating said plug within said pin to prevent separation and the loss thereof, said means comprising a constriction of said axial bore at said head portion and said plug having a reduced neck section for slidable reception therein.

5. A fastener in accordance with claim 4 wherein said neck section is sufficient in axial length to permit complete insertion and withdrawal of said plug with respect to said boss, said reduced neck section extending through said constriction outside said pin to said enlarged end, and said inner end having a rounded tip.

6. A fastener in accordance with claim 5 wherein said pin member is of nylon material.

7. A fastener in accordance with claim 6 wherein said plug member is of brass material.

* * * * *